United States Patent
Kuepper

(10) Patent No.: US 10,197,098 B1
(45) Date of Patent: Feb. 5, 2019

(54) LOAD ABSORBING DIRECT METAL DEPOSITION RACEWAY BEARING WITH ROLLING CONTACT

(71) Applicant: ROTEK INCORPORATED, Aurora, OH (US)

(72) Inventor: Frank Kuepper, Solon, OH (US)

(73) Assignee: Rotek Incorporated, Aurora, OH (US)

( * ) Notice: Subject to any disclaimer, the term of this patent is extended or adjusted under 35 U.S.C. 154(b) by 27 days.

(21) Appl. No.: 15/669,239

(22) Filed: Aug. 4, 2017

(51) Int. Cl.
| | |
|---|---|
| *F16C 33/64* | (2006.01) |
| *F16C 19/18* | (2006.01) |
| *F16C 33/61* | (2006.01) |
| *B23K 26/342* | (2014.01) |
| *F16C 19/52* | (2006.01) |

(52) U.S. Cl.
CPC ............ *F16C 33/64* (2013.01); *B23K 26/342* (2015.10); *F16C 19/183* (2013.01); *F16C 19/527* (2013.01); *F16C 33/61* (2013.01); *F16C 2220/24* (2013.01)

(58) Field of Classification Search
CPC ...................................................... F16C 33/64
See application file for complete search history.

(56) References Cited

U.S. PATENT DOCUMENTS

| | | | |
|---|---|---|---|
| 4,505,525 A | 3/1985 | Wolzenburg | |
| 4,568,205 A | 2/1986 | Basener | |
| 9,976,596 B2 * | 5/2018 | Krebs | F16C 19/364 |
| 2005/0008274 A1 * | 1/2005 | Helbig | F16C 19/166 384/516 |
| 2015/0055909 A1 | 2/2015 | Loke | |
| 2017/0036395 A1 * | 2/2017 | Sanz | B29C 70/70 |
| 2017/0298990 A1 * | 10/2017 | Lozier | F16C 33/6696 |
| 2018/0172041 A1 * | 6/2018 | Boyer | F15D 1/009 |
| 2018/0195559 A1 * | 7/2018 | Hallman | F16C 35/063 |
| 2018/0195601 A1 * | 7/2018 | Hallman | F16H 57/08 |
| 2018/0298949 A1 * | 10/2018 | Krebs | F16C 19/364 |

FOREIGN PATENT DOCUMENTS

| | | |
|---|---|---|
| DE | 102008013285 A1 | 9/2009 |
| WO | 2015091723 A2 | 6/2015 |

* cited by examiner

*Primary Examiner* — Thomas R Hannon
(74) *Attorney, Agent, or Firm* — RMCK Law Group PLC

(57) ABSTRACT

A bearing constructed in accordance to one example of the present disclosure includes at least one inner bearing ring, at least one outer bearing ring, at least one rolling element and a direct metal deposition (DMD) raceway architecture. The DMD raceway architecture is disposed between the at least one inner and outer bearing rings. The DMD raceway architecture includes an inner DMD structure that defines an inner raceway and an outer DMD structure that defines an outer raceway. The inner and outer raceways are configured to support the at least one rolling element.

17 Claims, 2 Drawing Sheets

LOAD ABSORBING DIRECT METAL DEPOSITION RACEWAY BEARING WITH ROLLING CONTACT

FIELD

The present disclosure relates generally to wire race bearings and more specifically to a wire race bearing having raceways formed by Direct Metal Deposition (DMD).

BACKGROUND

A wire race bearing is a rolling element bearing having rollers that run on races resembling loop sections of wire. Wire race bearings are preferred in applications subject to shock loads, deflections (out-of flatness conditions) and vibrations. Wire race bearings act as a damping element and operate at reduced noise levels compared to some of the other bearings with rolling contact. A known disadvantage to such a configuration having a wire is that a gap exists between the start and end of each wire. These gaps are often subject to additional wear, tear and noise generation such as clicking and knocking noises.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A bearing constructed in accordance to one example of the present disclosure includes at least one inner bearing ring, at least one outer bearing ring, at least one rolling element and a direct metal deposition (DMD) raceway architecture. The DMD raceway architecture is disposed between the at least one inner and outer bearing rings. The DMD raceway architecture includes an inner DMD structure that defines an inner raceway and an outer DMD structure that defines an outer raceway. The inner and outer raceways are configured to support the at least one rolling element.

According to additional features, one of the inner and outer DMD structures is formed in two parts. The DMD raceway architecture is formed in multiple layers as one homogeneous cross-section. The DMD raceway architecture is fused to the inner and outer bearing rings. The DMD raceway architecture is defined by a plurality of solid portions and air pockets providing one of a honeycomb and micro channel-like structure. The inner and outer raceways are machined to generate a finished raceway surface.

In other features the inner DMD structure comprises a first race structure having a first inner raceway and a second race structure having a second inner raceway. The outer DMD structure comprises a first support structure having a first outer raceway and a second support structure having a second outer raceway. The at least one rolling element includes two rolling elements. A first rolling element is disposed between the first inner and outer raceway. The second rolling element is disposed between the second inner and outer raceway. The inner and outer bearing rings can be formed from one of forged seamless rolled rings, profiled bar material processed on a bending machine and butt-welded into a ring, casted rings and flat plate burn-out rings.

A method of making a bearing according to one example of the present disclosure includes providing an inner and an outer bearing ring. A raceway architecture is formed by direct metal deposition (DMD) between the inner and outer bearing ring. The raceway architecture defines an inner and outer raceway. At least one rolling element is positioned between the inner and outer raceways.

According to other features, an inner DMD structure is formed that defines the inner raceway. An outer DMD structure is formed that defines the outer raceway. The raceway architecture is formed in multiple layers as one homogeneous cross-section. The inner DMD structure is fused to the inner bearing ring. The outer DMD structure is fused to the outer bearing ring. A plurality of solid portions and air pockets are formed in the raceway architecture providing one of a honeycomb and micro-channel-like structure. The inner and outer raceways are machined.

BRIEF DESCRIPTION OF THE DRAWINGS

The present disclosure will become more fully understood from the detailed description and the accompanying drawings, wherein.

DETAILED DESCRIPTION

Figure 1:
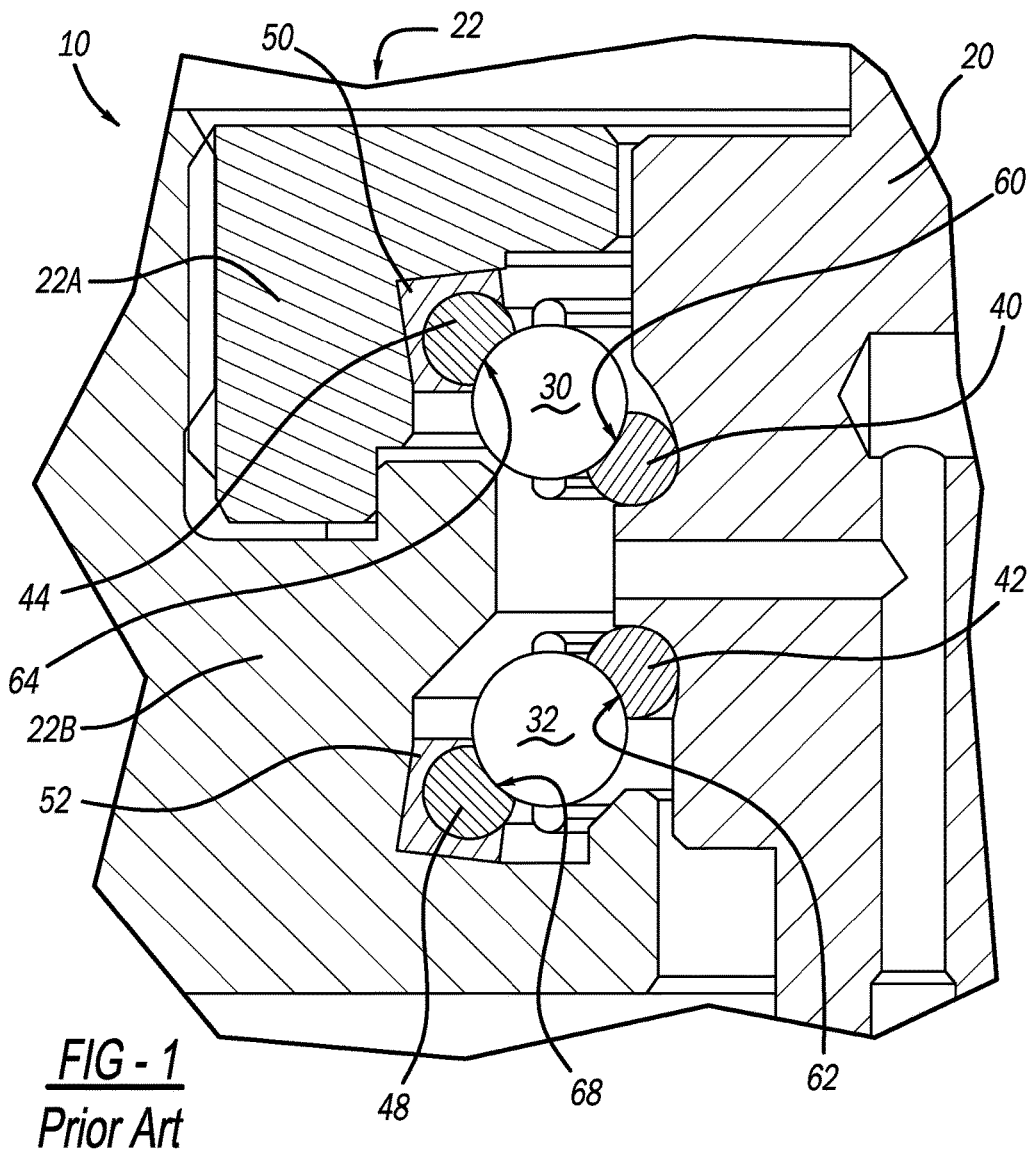
FIG. 1 is a sectional view of a wire race bearing constructed in accordance to one example of Prior Art.
Figure 2:
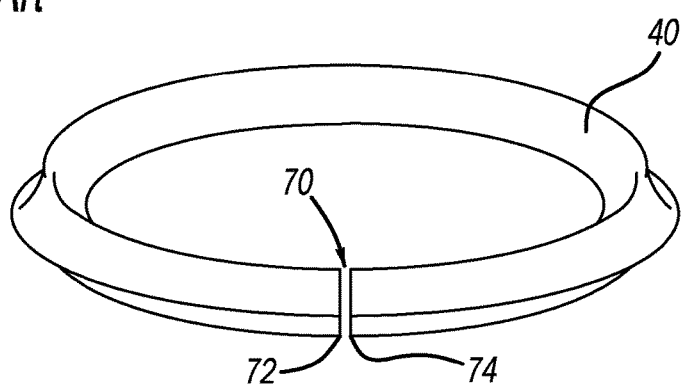
FIG. 2 is a perspective view of a wire of the wire race bearing of FIG. 1 according to Prior Art.

With initial reference to FIG. 1, a wire race bearing constructed in accordance to one example of Prior Art is shown and generally identified at reference 10. The wire race bearing 10 includes an inner bearing ring 20, an outer bearing ring assembly 22, first and second rolling elements 30, 32, and race wires 40, 42, 44 and 48. The outer bearing ring assembly 22 includes a first outer bearing ring 22A and a second outer bearing ring 22B. A first resilient intermediate ring 50 is disposed between the first outer bearing ring 22A and the first rolling element 30. A second resilient intermediate ring 52 is disposed between the second outer bearing ring 22B and the second rolling element 32. The wires 40, 42, 44 and 48 have respective raceways 60, 62, 64 and 68 for the rolling elements 30, 32 to roll along. As shown in FIG. 2, the wire 40 includes a gap 70 defined between a beginning point 72 and an end point 74 of the wire 40. It is appreciated that the other wires 42, 44 and 48 also define respective gaps as well. The main function of the wires 40, 42, 44 and 48 is to provide the respective raceways 60, 62, 64 and 68 that address the wear and fatigue of the rolling contact area between the rolling elements 30, 32 and the wires 40, 42, 44 and 48. The wires 40, 42, 44 and 48 have very specific material properties and have higher hardness that the surrounding material. The wires can be typically sitting in a wire bed that is machined into a companion ring. The companion rings are either seamless rolled rings or profiled bar material processed on a bending machine and butt-welded into a ring or casted rings of any shape and size. The wire race bearing 10 enables an individual design of the enclosing construction as well as a free choice of material such as, but not limited to, aluminum.

Figure 3:
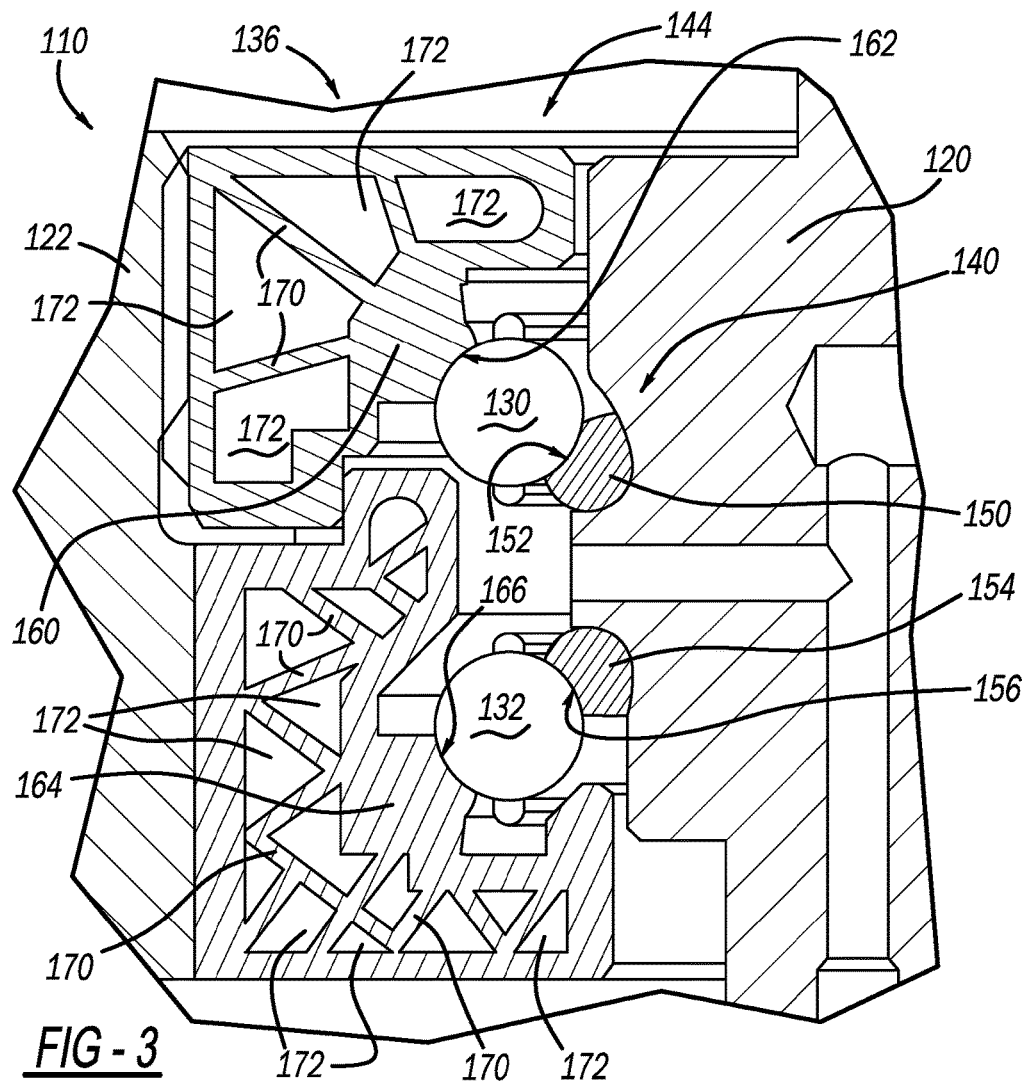
FIG. 3 is a sectional view of a wire race bearing constructed in part by Direct Metal Deposition (DMD) according to one example of the present disclosure.
Figure 4:
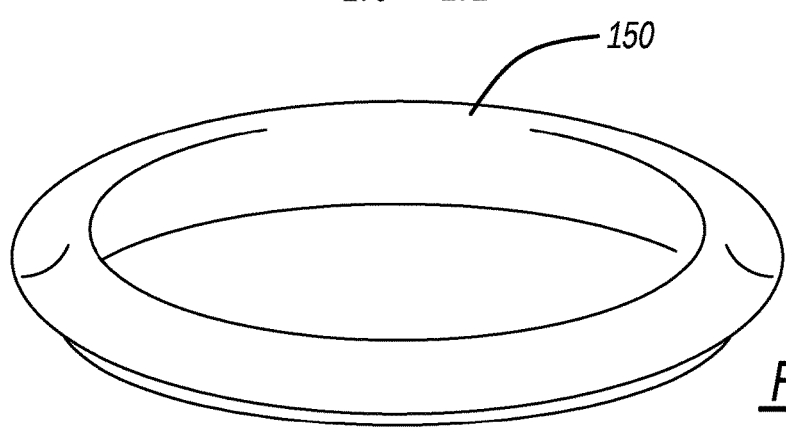
FIG. 4 is a perspective view of a wire of the wire race bearing of FIG. 3 according to one example of the present disclosure.

Turning now to FIGS. 3 and 4, a bearing constructed in accordance to additional features of the present disclosure is shown and generally identified at reference 110. The bearing 110 includes an inner bearing ring 120, an outer bearing ring 122, first and second rolling elements 130, 132 and a Direct Metal Deposition (DMD) raceway architecture 136. The DMD raceway architecture 136 replaces the wires 40, 42, 44 and 48 provided in wire race bearing 10. The DMD raceway architecture 136 generally includes an inner DMD structure, collectively identified at 140 and an outer DMD structure, collectively identified at 144. The inner DMD structure 140 can include a first race structure 150 having a first inner raceway 152 and a second race structure 154 having a second inner raceway 156. The first and second raceways 152 and 156 are collectively referred to herein as an inner raceway. The outer DMD structure 144 can be formed in two parts and include a first support structure 160 having a first outer raceway 162 and a second support structure 164 having a second outer raceway 166. The first and second raceways 162 and 166 are collectively referred to herein as an outer raceway. The first raceways 152, 162 and second raceways 156, 166 can each have an overlap zone resulting in a continuous structure as they are formed by DMD thus eliminating the undesirable gap 70 (FIG. 2) in prior art examples.

The inner and outer bearing rings 120 and 122 can be formed in one example by forged seamless rolled rings. In other examples the inner and outer bearing rings 120 and 122 can be formed by a profiled bar material processed on a bending machine and butt-welded into a ring. In other arrangements, the inner and outer bearing rings 120 and 122 can be casted rings or flat plate burn-out rings. Other arrangements are contemplated for the inner and outer bearing rings within the scope of the present disclosure.

The first and second support structures 160 and 164 can comprise a honeycomb or micro channel-like structure. The first and second support structures 160 and 164 have a plurality of solid portions 170 and a plurality of air pockets 172. The air pockets 172 inside the DMD raceway architecture 136 can act as sound barriers and improve the acoustic performance of the bearing 110.

DMD is a form of rapid tooling process that makes components and molds from metal powder that is melted by a laser and subsequently solidified in place. DMD allows the production or reconfiguration of any type of raceway architecture that is made out of the actual end material, such as, but not limited to, titanium, tungsten alloys or stellites. The DMD raceway architecture 136 is created by computer aided design and can be customized for any application. The DMD raceway architecture 136 is made with multiple layers as one homogeneous cross-section. The DMD raceway architecture 136 is fused to the respective inner and outer bearing rings 120 and 122. The tribological raceway system is highly customizable from a material property perspective. In this way, the particular configuration shown in FIGS. 3 and 4 is merely exemplary. As such, other geometries having various solid portions and/or air pockets can be constructed within the scope of the present disclosure. Subsequent to formation of the DMD raceway architecture 136, the respective raceways 162 and 166 are machined by means of hard turning or grinding to generate a finished raceway surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. In this regard, the ordering of method steps is not necessarily fixed, but may be capable of being modified without departing from the instant teachings. Such variations are not to be regarded as a departure from the disclosure, and all such modifications are intended to be included within the scope of the disclosure.

What is claimed is:

1. A bearing comprising:
   at least one inner bearing ring;
   at least one outer bearing ring;
   at least one rolling element; and
   a direct metal deposition (DMD) raceway architecture disposed between the inner and outer bearing ring, the DMD raceway architecture including an inner DMD structure that defines an inner raceway and an outer DMD structure that defines an outer raceway, wherein the inner and outer raceways are configured to support the at least one rolling element.

2. The bearing of claim 1 wherein one of the inner and outer DMD structures is formed in two parts.

3. The bearing of claim 1 wherein the DMD raceway architecture is formed in multiple layers as one homogeneous cross-section.

4. The bearing of claim 1 wherein the DMD raceway architecture is fused to the inner and outer bearing rings.

5. The bearing of claim 1 wherein the DMD raceway architecture is defined by a plurality of solid portions and air pockets providing one of a honeycomb and micro channel-like structure.

6. The bearing of claim 1 wherein the inner and outer raceways are machined to generate a finished raceway surface.

7. The bearing of claim 1 wherein the inner DMD structure comprises a first race structure having a first inner raceway and a second race structure having a second inner raceway.

8. The bearing of claim 7 wherein the outer DMD structure comprises a first support structure having a first outer raceway and a second support structure having a second outer raceway.

9. The bearing of claim 8 wherein the at least one rolling element comprises two rolling elements, wherein a first rolling element is disposed between the first inner and outer raceway and the second rolling element is disposed between the second inner and outer raceway.

10. The bearing of claim 1 wherein the inner and outer bearing rings are formed from one of forged seamless rolled rings, profiled bar material processed on a bending machine and butt-welded into a ring, casted rings and flat plate burn-out rings.

11. The bearing of claim 1 wherein the inner raceway and the outer raceway are both continuous.

12. A method of making a bearing, the method comprising:
    providing an inner bearing ring;
    providing an outer bearing ring;
    forming a raceway architecture by direct metal deposition (DMD) between the inner and outer bearing ring, the raceway architecture defining an inner and outer raceway; and
    positioning at least one rolling element between the inner and outer raceways.

13. The method of making the bearing of claim 12 wherein forming the raceway architecture further comprises:
    forming an inner DMD structure that defines the inner raceway; and forming an outer DMD structure that defines the outer raceway.

14. The method of claim 13 wherein forming the raceway architecture comprises forming the raceway architecture in multiple layers as one homogeneous cross-section.

15. The method of claim 13 wherein forming the raceway architecture comprises:
   fusing the inner DMD structure to the inner bearing ring; and
   fusing the outer DMD structure to the outer bearing ring.

16. The method of claim 12 wherein forming the raceway architecture comprises forming a plurality of solid portions and air pockets providing one of a honeycomb and microchannel-like structure.

17. The method of claim 12, further comprising:
   machining the inner and outer raceways.

* * * * *